(12) United States Patent
Meoli

(10) Patent No.: US 12,283,718 B2
(45) Date of Patent: Apr. 22, 2025

(54) MIKROPACT ADAPTIVE CHARGE TRANSFERENCE DEVICE

(71) Applicant: Michael J Meoli, Bridgewater, MA (US)

(72) Inventor: Michael J Meoli, Bridgewater, MA (US)

(*) Notice: Subject to any disclaimer, the term of this patent is extended or adjusted under 35 U.S.C. 154(b) by 304 days.

(21) Appl. No.: 17/307,923

(22) Filed: May 4, 2021

(65) Prior Publication Data

US 2021/0359377 A1 Nov. 18, 2021

Related U.S. Application Data

(60) Provisional application No. 63/020,003, filed on May 4, 2020.

(51) Int. Cl.
*H01M 50/503* (2021.01)
*H02J 1/00* (2006.01)

(52) U.S. Cl.
CPC ............ *H01M 50/503* (2021.01); *H02J 1/00* (2013.01); *H01M 2220/30* (2013.01)

(58) Field of Classification Search
CPC ........... H01M 50/503; H01M 2220/30; H01M 50/247; H01M 50/249; H01M 50/258; H01M 2220/20; H02J 1/00; Y02E 60/10
USPC ........................................................ 307/150
See application file for complete search history.

(56) References Cited

U.S. PATENT DOCUMENTS

| 4,280,067 A * | 7/1981 | Kohyama | H01L 29/76816 257/E27.083 |
| 2012/0049800 A1* | 3/2012 | Johnson | H02J 7/0044 320/114 |
| 2013/0015714 A1* | 1/2013 | Kwok | H02J 1/10 307/75 |
| 2020/0313451 A1* | 10/2020 | An | H02J 7/00 |

FOREIGN PATENT DOCUMENTS

CN 110557468 * 12/2019

* cited by examiner

*Primary Examiner* — Richard Tan
(74) *Attorney, Agent, or Firm* — JWIP & Patent Services, LLC; Jacob G. Weintraub, Esq.

(57) ABSTRACT

The present invention is directed to mikropact adaptive charge transference (ACT) devices that offer the combination of charge storage, charge pass-through, and charge conversion/adaption in a compact shell that is suitable for consumer portability in the pocket of the consumer or in the hand of the consumer. Moreover, the ability to achieve the mikropact nature of the device derives, in large part, from the novel reversible multi-stage charge transference microcore structure that is removable and integrates with a mikropact containment shell, e.g., wherein the mikropact device incorporates both a 12V DC male socket connector and a 12V DC female socket port. In particular, the devices of the present invention are constructed to reversibly and operationally integrate a removable multi-stage charge transference micro-core structure. In addition, the containment shell is adapted to incorporate one or more convenience tools.

19 Claims, 7 Drawing Sheets

14

MIKROPACT ADAPTIVE CHARGE TRANSFERENCE DEVICE

RELATED APPLICATIONS

This application claims priority to U.S. Provisional Patent Application No. 63/020,003, filed on May 4, 2020; the entirety of which is incorporated herein by reference.

BACKGROUND OF THE INVENTION

Well-known charge transference devices include 1) storage devices that supply a stored charge source for other devices, 2) devices that merely provide current pass-through (conduit) to connect two devices that may have the inability to directly connect via a male/female bridge connection, and 3) devices that serve to adapt/convert the voltage and/or current along the input pathway to the output. Achieving portability of these devices has been at the forefront of consumer demand, where consumers who already carry portable devices like mobile phones have ever more limited space to carry any additional devices in their pockets. However, there are currently no devices that balance utility of a charge transference device with this portability required by the consumer.

Storage devices such as portable power chargers are widely available on the market in a variety of shapes, sizes and designs. However, such power chargers are limited in purpose and designed for simply charging portable electronic devices, such as smart phones, portable music players, and the like. These portable power chargers are typically designed to store and supply DC power to charge hand-held electronic devices, but lack the expanded charging capacity to jump start a car battery or the utility as power adapter/converters for different wall outlet systems.

As an alternative to conventional power banks, several "all-in-one" power banks have recently been designed that also offer pass-through connections in response to the growing demand. Such all-in-one power banks have integrated additional charging ports into a conventional power bank with a wider connection variety, as well as components that offer such utility as wireless charging, scanners/readers, or other such devices; and therefore provide multiple functions within a single power bank. However, the greater the number of charging input/output options of a portable power charger design, and in particular the incorporation of both a 12V DC male socket connector and a 12V DC female socket port (and the incorporation of the additional tools for convenience), the larger in weight and volume the power charger; ultimately making these all-in-one power chargers convenient, but not truly portable by the average consumer of portable electronic devices in the space of consumer's pocket or hand.

Although recent solutions have attempted to address convenience through stackable battery pack power systems, such systems carry the burden of requiring a series of separate modules that achieve the convenience, but leave portability behind. Moreover, a combination of such known solutions has yet to be made with a voltage adapter/converter for wall outlet systems. Further, even with separate multi-source power adapters that are available on the market for making a charging cable compatible with multiple wall outlet power sources, each of the interfaces is usually a separate piece, and therefore difficult to keep track of when not in use.

As such, there remains a clear need for charge transference devices that offer the combination of charge storage, charge pass-through, and charge conversion/adaption in a compact shell that is suitable for consumer portability in the pocket of the consumer or in the hand of the consumer. Further, there is also a need for such charge transference devices to further incorporate convenience tools within the confines of the consumer portable compact shell.

SUMMARY OF THE INVENTION

Accordingly, the present invention is directed to mikropact adaptive charge transference (ACT) devices that offer the combination of charge storage, charge pass-through, and charge conversion/adaption in a compact shell that is suitable for consumer portability in the pocket of the consumer or in the hand of the consumer. Moreover, the ability to achieve the mikropact nature of the device derives, in large part, from the novel reversible multi-stage charge transference micro-core structure that is removable and integrates with a mikropact containment shell, e.g., wherein the mikropact device incorporates both a 12V DC male socket connector and a 12V DC female socket port. In particular, the devices of the present invention are constructed to reversibly and operationally integrate a removable multi-stage charge transference micro-core structure. In addition, the containment shell is adapted to incorporate one or more convenience tools.

As such, one aspect of the present invention provides a mikropact adaptive charge transference (ACT) device. The mikropact ACT device comprises: a mikropact containment shell constructed to reversibly and operationally integrate a removable multi-stage charge transference micro-core structure, wherein the containment shell is adapted to incorporate one or more convenience tools; and a removable multi-stage charge transference micro-core structure that may be reversibly integrated with the mikropact containment shell.

Another aspect of the present invention provides an expandable mikropact adaptive charge transference (ACT) device. The expandable mikropact ACT device comprises: a mikropact adaptive charge transference (ACT) device of the present invention; a rail slide adapter suitable for transitory combination with one or more expansion convenience tool units incorporating a complimentary rail slide affording transitory connection of the expansion convenience tool unit with the mikropact ACT device; and one or more expansion convenience tool units incorporating a complimentary rail slide affording transitory connection of the expansion convenience tool unit with the mikropact ACT device.

BRIEF DESCRIPTION OF THE FIGURES

Advantages of the present apparatus will be apparent from the following detailed description, which description should be considered in combination with the accompanying figures, which are not intended limit the scope of the invention in any way.

DETAILED DESCRIPTION OF THE INVENTION

Figure 1:
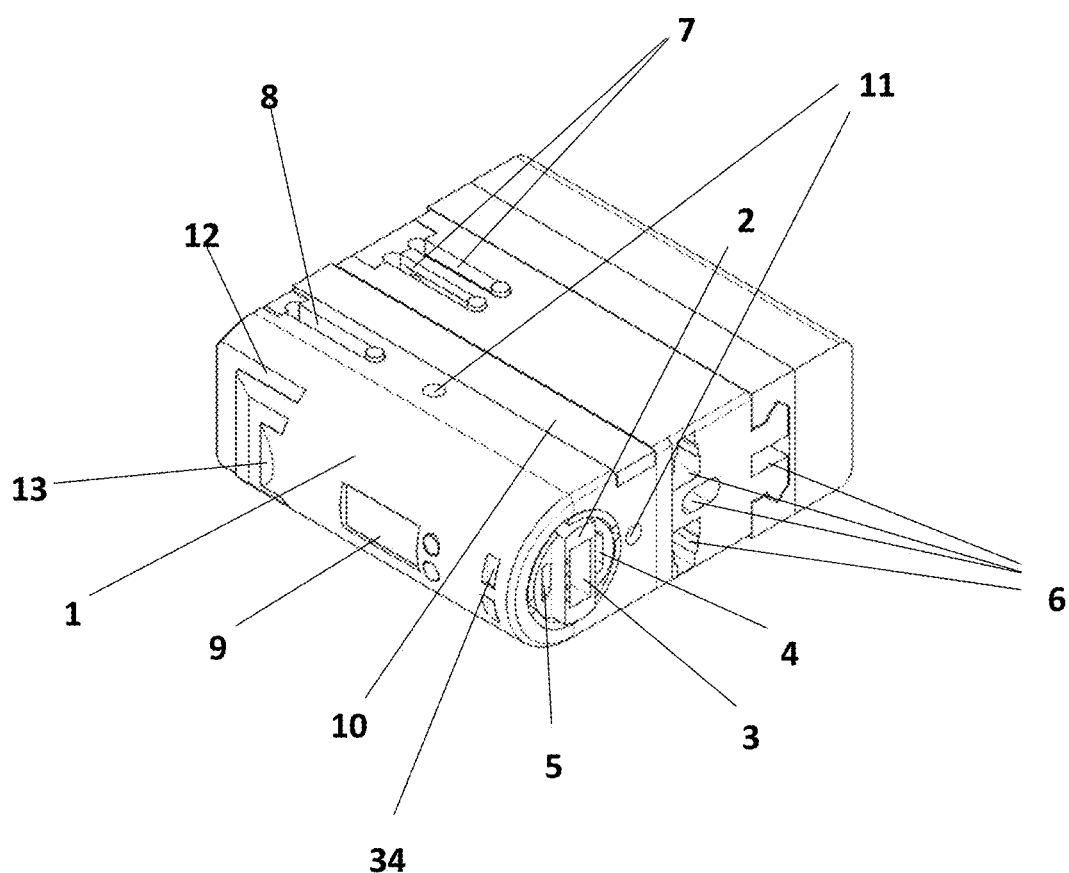
FIG. 1 depicts a top down perspective view of certain embodiments of the mikropact adaptive charge transference (ACT) devices of the present invention.

Current charge transference devices on the market lack the balance of portability with utility. Given that true portability is directly related to the ability of the device to be carried or moved by the consumer in a convenient and reasonable manner, consumer portability would dictate the necessity for devices that are sized to fit in the consumer's hand or pocket. Contrary to existing devices, where increased complexity of devices (especially those that incorporate both 12V DC female socket port and 12V DC male socket connectors) increases size while decreasing portability, the mikropact ACT devices of the present invention incorporate a removable multi-stage charge transference micro-core structure that is reversible and operationally integrated. Such reversibility affords increased space-efficiency of the device and results in the novel and inventive mikropact structure.

In response to this consumer need/demand, the present invention is directed to mikropact adaptive charge transference (ACT) devices that offer the combination of charge storage, charge pass-through, and charge conversion/adaption in a compact shell that is suitable for consumer portability in the pocket of the consumer or in the hand of the consumer. Moreover, the ability to achieve the mikropact nature of the device derives, in large part, from the novel reversible multi-stage charge transference micro-core structure that is removable and integrates with a mikropact containment shell, e.g., wherein the mikropact device incorporates both a 12V DC male socket connector and a 12V DC female socket port. In particular, the devices of the present invention are constructed to reversibly and operationally integrate a removable multi-stage charge transference micro-core structure. In addition, the containment shell is adapted to incorporate one or more convenience tools.

Further, the mikropact ACT devices of the present invention increase functionality through the incorporation of convenience tools, but offer even further functionality with expansion convenience tool units, e.g., through interactive rail systems.

The present invention, including mikropact adaptive charge transference (ACT) device, and internal and expanded components thereof, will be described with reference to the following definitions that, for convenience, are set forth below. Unless otherwise specified, the below terms used herein are defined as follows:

I. Definitions

As used herein, the term "a," "an," "the" and similar terms used in the context of the present invention (especially in the context of the claims) are to be construed to cover both the singular and plural unless otherwise indicated herein or clearly contradicted by the context.

The term "about" is used herein in reference to the degree or extent of the term which it modifies, and that such extent may be 100% or near to but not exactly 100% of the modified term; industry accepted standards will assist in defining the quantitative aspects of how "near" 100% is defined. In particular embodiments, the term "about" indicates ±3%, ±2%, ±1% or ±0.5%. In a particular embodiment, for example, the language "about 90 degrees" would be exactly 90 degrees. In one alternative particular embodiment, for example, the language "about 90 degrees" would mean 90 degrees±2%.

The term "adaptive" is used herein to describe the devices of the present invention that are convertible in form, function, or character to provide one or more utilities, e.g., convenience tools, above and beyond charge transference.

The language "charge transference" is used herein to describe the action/behavior of electrical charge movement, or charge path, in the following functional ways or stages: charge storage, charge pass-through, and charge conversion/adaption. Such charge movement is also known as electrical energy movement or storage suitable to power devices. In this way, a "charge transference device" is a device that offers charge storage, charge pass-through, or charge conversion/adaption.

The language "conductively interfaces" is used herein to describe an interface/contact/link between two entities that allows electrical connection between the two entities.

The term "connector" is used herein to describe an electrical connection that offers the male component of a male-female electrical coupling, i.e., capable of providing a protruding element for receipt by/into a female port cavity or socket.

The language "convenience tools" describes functional utilities that offer convenience, which do not relate to transference of charge from or through the mikropact device.

The term "mikropact" is used herein to describe the feature of the devices of the present invention that are efficiently-packed within a small casing or shell as a result of the integration of a reversible charge transference micro-core structure that is a removable from the device containment shell. Such reversibility affords increased space-efficiency of the device and results in the novel and inventive mikropact structure of the mikropact charge transference devices of the present invention. In certain embodiments, the small casing or shell (i.e., the mikropact containment shell) is sized to fit in an average pocket volume.

The term "operationally associated" is used herein to describe items that are associated, connected, or related in such a manner as to achieve a common intended purpose of operation of the items together.

The language "Picatinny rail" is art-recognized, and is used herein to describe a military standard rail interface system that provides a mounting platform for firearm accessories. It was originally used for mounting scopes atop the receivers of larger caliber rifles.

The term "port" is used herein as an electrical connection that offers the female component of a male-female electrical coupling, i.e., capable of providing a female cavity or socket for receipt of a protruding male connector element.

The term "retractable" is art-recognized and is used herein to describe features, such as pins or connectors, that can be extended outwards from the housing or shell to a withdrawn or pulled back position.

The language "12V socket," is art recognized, and used herein to describe connectors and ports that are often known as a car cigarette lighter or 12V auxiliary power outlet, and which are known as the primary method by which power is delivered to portable electronics in cars, trucks, recreational vehicles, boats, and in a handful of other contexts.

The term "stage" as used in the language "multi-stage" is used herein to describe the possession of the characteristics of one of the following charge transference actions: charge storage, charge pass-through, and charge conversion/adaption. Therefore, the term "multi-stage" refers to the possession of the characteristics of two or more of these charge transference actions.

II. Mikropact Adaptive Charge Transference (ACT) Devices of The Invention

The present invention described herein relates to charge transference devices that incorporate a removable multi-stage charge transference micro-core structure that is reversible and may be operationally integrated within a mikropact containment shell. Such reversibility affords increased space-efficiency of the device and results in the novel and inventive mikropact structure of the mikropact charge transference devices of the present invention. Further, the incorporation of additional convenience tools into the device allows the device to be adaptive for use in form, function, or character in utilities above and beyond charge transference.

As such, one embodiment of the present invention provides a mikropact adaptive charge transference (ACT) device comprising:
- a mikropact containment shell constructed to reversibly and operationally integrate a removable multi-stage charge transference micro-core structure, wherein the containment shell is adapted to incorporate one or more convenience tools; and
- a removable multi-stage charge transference micro-core structure that may be reversibly integrated with the mikropact containment shell.

In certain embodiments of the present invention, the mikropact containment shell is sized to fit in an average pocket volume, e.g., which is designed to fit the average adult hand volume. In this respect, it is understood that the average adult hand volume is less than or equal to about 23-24 cubic inches.

In certain embodiments, the mikropact containment shell is sized to fit within the average adult hand (e.g., such that fingertips may be used to grip and surround the shell while positioned in the palm). In this respect, it is understood that the average length of an adult hand is less than or equal to about 7.6 inches, where average adult male's hand is 7.6 inches, and the average adult female's hand is 6.8 inches—measured from the tip of the longest finger to the crease under the palm. In particular embodiments, the mikropact containment shell may be selected from the following dimensions:
- 4 inches×4 inches×1.5 inches;
- 4 inches×3.5 inches×1.5 inches;
- 3.5 inches×3.5 inches×1.5 inches;
- 3.25 inches×3.25 inches×1.5 inches;
- 3.25 inches×3 inches×1.5 inches; or
- 3.5 inches×2.75 inches×1.5 inches.

In certain embodiments of the present invention, the mikropact ACT device incorporates both 12V DC female socket port and 12V DC male socket connectors.

In certain embodiments of the present invention, the charge input of the mikropact ACT device is selected from the group consisting of 5V, 9V, 12V, 110V, 220V 230V, 127V, 115V, 120V, and 240V.

In certain embodiments of the present invention, the charge output of the mikropact ACT device is selected from the group consisting of 5V, 9V, 12V, 110V, 220V 230V, 127V, 115V, 120V, and 240V.

In certain embodiments of the present invention, the mikropact ACT device provides a combination of both AC and DC female socket ports and male connectors.

In certain embodiments of the present invention, the AC and DC female socket ports and male connectors are selected from wall outlet plug ports and connectors, USB ports and connectors, and 12V DC male socket connectors and female socket ports.

In certain embodiments of the present invention, the USB connectors and ports are selected from the group consisting of USB type A, USB type B, USB type C, USB mini, USB micro, and USB lightning. In particular embodiments, the USB connectors and ports are selected from the group consisting of USB type C, USB mini, USB micro, and USB lightning.

In certain embodiments of the present invention, the ports and connectors of the mikropact ACT device may be used bi-directionally, e.g., as input and output.

In certain embodiments of the present invention, the mikropact ACT device further comprises one or more components selected from the group consisting of a solar collector, a wireless charging output, a wireless charging input, and any combination thereof. In certain embodiments, the wireless charging output is for charging at least one phone or watch, e.g., using u-beam, IR, or CHI wireless charging. In particular embodiments, the wireless charging output is for charging both a phone and a watch.

In certain embodiments of the present invention, the mikropact ACT device further comprises a high input/output charging port system. In certain embodiments, the high input/output charging port system comprises a single port. In certain alternative embodiments, the high input/output charging port system comprises a double port.

In certain embodiments of the present invention, the mikropact ACT device further comprises at least one integrated flexible charging cord. In certain embodiments, the mikropact ACT device further comprises interchangeable adapter tips for the use with the integrated flexible charging cord. In particular embodiments, the tips are used for converting USB type A to other USB types. In additional particular embodiments, the tips are housed in the shell. In specific embodiments, the tips are magnetically connected.

In certain embodiments of the present invention, the mikropact ACT device further comprises a digital display. In certain embodiments, the display provides access to, e.g., displays, one or more of the following: displaying mode, status (e.g., charging, discharging, and converting charge), settings to each accessory, time, or the time remaining to operate self-sufficiently. In particular embodiments the display further comprises interactive buttons in or next to the display (e.g., 1 mode button and/or 1 set button). In specific embodiments, the interactive button may be a mode selector, light selector, laser selector, or a panic button.

In certain embodiments of the present invention, the charge input is passed through the mikropact ACT device without conversion.

In certain embodiments of the present invention, the mikropact ACT device converts the charge input for use by a device that could not otherwise use the input charge without conversion. In certain embodiments, the mikropact ACT device is suitable for use as a global power adapter comprising an AC input and an AC output operationally associated to convert an input voltage to a different output voltage. In particular embodiments, the mikropact ACT device is compatible with power conversions required between at least 200 countries, e.g., offering male connectors and female ports in orientations suitable to input and output charge in at least 200 countries. In specific embodiments, the compatibility is based on the ability to provide male connectors and female ports of a range of plug types, including, but not limited to Type A to Type O. For example, the power adapter may be used to convert between EU and UK voltages and/or USA and Australia voltages.

In certain embodiments of the present invention, the mikropact ACT device comprises one or more retractable pins as an AC male connector, e.g., with retractable pins to create one or more male connector orientations as required for different regional voltages, e.g., male connectors of a range of plug types, including, but not limited to Type A to Type O.

In certain embodiments of the present invention, the mikropact ACT device further comprises, e.g., incorporates, a retractable European Union ground pin.

In certain embodiments of the present invention, the mikropact ACT device further comprises an additional battery source. In certain embodiments, the battery source is positioned in a consumer accessible compartment to allow replacement of battery source. In particular embodiments, the battery is rechargeable. In alternative particular embodiments, the battery is non-rechargeable.

In certain embodiments of the present invention, the mikropact ACT device further comprises surge protection. In certain embodiments, the surge protection is a fuse, e.g., a reset fuse.

In certain embodiments of the present invention, the mikropact containment shell comprises carbon-fiber.

In certain embodiments of the present invention, the mikropact containment shell comprises a rubber casing.

In certain embodiments of the present invention, the mikropact ACT device will supply charge to multiple devices at one time, e.g., limited by the number of ports and connectors.

The methods of preparation of the devices of the present invention utilize a combination of hardware and software suitable to prepare the devices described herein, using known techniques solely in light of the novel and inventive contributions of the present invention, and described herein.

A. Micro-Core Structure

The mikropact adaptive charge transference (ACT) device of the present invention comprises a removable multi-stage charge transference micro-core structure that may be reversibly integrated with the mikropact containment shell.

In certain embodiments of the micro-core structure of the present invention, the multi-stage charge transference micro-core structure provides charge storage, charge pass-through, and charge conversion/adaption.

In certain embodiments of the micro-core structure of the present invention, the multi-stage charge transference micro-core structure may be removed from a female socket docking port, reversed, and operationally integrated with the mikropact containment shell to provide a 12V DC male socket connector, e.g. to receive 12V DC input from a female socket port. In certain embodiments, the 12V DC male socket connector and the female socket docking port are suitable to provide output or receive input. In particular embodiments, the female socket docking port is suitable for supplying 12V DC output to a 12V DC male socket connector.

In certain embodiments of the micro-core structure of the present invention, the multi-stage charge transference micro-core structure further comprises at least one retractable USB male connector (e.g., 2 retractable USB male connectors) and at least one USB female port connector, e.g., 2 USB female port connectors. In particular embodiments, the retractable USB male connector may provide access to data storage located on the micro-core structure.

In certain embodiments, the USB male connectors and USB female connectors are type matched. In particular embodiments, the USB male connectors and USB female connectors are USB type C and USB mini connectors.

In certain embodiments of the micro-core structure of the present invention, the multi-stage charge transference micro-core structure stores charge from any input charge to the device. In certain embodiments, the stored charge may be the result of direct charge input to the micro-core USB ports or connectors. In certain alternative embodiments, the stored charge may be the result of indirect charge input from other charge inputs to the mikropact adaptive charge transference (ACT) device.

In certain embodiments of the micro-core structure of the present invention, the removed multi-stage charge transference micro-core structure is independently wirelessly rechargeable without the mikropact containment shell.

In certain embodiments of the micro-core structure of the present invention, the removable multi-stage charge transference micro-core structure is suitable to convert charge from 12V DC input to an output selected from the group consisting of USB DC (e.g., USB type A, B C: mini, micro, and lightning), and AC. In particular embodiments the USB DC is selected from the group consisting of USB type C: mini, micro, and lightning.

In certain embodiments of the present invention, the removable multi-stage charge transference micro-core structure comprises a light, e.g., an LED light (e.g., used as an indicator light or flashlight based on light intensity)

B. Convenience Tools

The mikropact adaptive charge transference (ACT) devices of the present invention provide at least one convenience tool. In certain embodiments, the mikropact adaptive charge transference (ACT) devices of the present invention provide two or more convenience tools.

In certain embodiments of the present invention, the mikropact ACT device comprises a convenience tool selected from the group consisting of a Wi-Fi receiver, a Wi-Fi generator, i.e., "hotspot", a credit card reader, a Bluetooth receiver/transmitter, a GPS, a glass breaker, a seat belt cutter, a powered light, a laser light, a car battery starter (e.g., 12V input charge), a panic alarm, a speaker (e.g., smart speaker or Bluetooth speaker), a camera (e.g., dash-mounted, motion, or still), a lanyard (e.g., a panic alarm pull lanyard switch), SD card slot, SIM card slot, auto safety device for indicating dangerous conditions (e.g., car overturned or submerged in water), water sensor strobe, USB data storage (e.g., thumb drive, e.g., 132 GB) and any combination thereof. In certain embodiments, a subscription service may be offered to enable the convenience tool, for example for Wi-Fi generator, GPS location/tracking, SIM card slot use, and auto safety monitoring. In certain embodiments, the powered light is used as a flashlight or strobe (e.g., red, white, or multi-color). In certain embodiments, the laser light is used as a strobe or laser pointer (e.g., comprising an LED, e.g., multi-color). In certain embodiments, the camera may be used as a motion sensor to trigger recording and/or panic alarm.

In certain embodiments of the present invention, the convenience tool comprises a glass breaker integrated into the removable 12V DC male socket connector.

In certain embodiments of the present invention, the mikropact ACT device further comprises a rail slide adapter suitable for transitory combination with one or more expansion convenience tool units incorporating a complimentary rail slide affording transitory connection of the expansion convenience tool unit with the mikropact ACT device. In certain embodiments, the rail slide adapter is integrated as part of the mikropact containment shell. In certain alternative embodiments, the rail slide adapter is mounted on the mikropact containment shell as a separate unit.

C. Expansion Convenience Tool Units

In certain embodiments of the present invention, the mikropact ACT device further comprises a rail slide adapter (e.g., integrated as part of the mikropact containment shell or mounted on the mikropact containment shell as a separate unit) suitable for transitory combination with one or more expansion convenience tool units incorporating a complimentary rail slide affording transitory connection of the expansion convenience tool unit with the mikropact ACT device.

In certain embodiments of the present invention, the expansion convenience tool units conductively interfaces with the adaptive charge transference (ACT) device through one or more points on the rail slide adapter and complimentary rail slide, e.g., rail slot contacts.

In certain embodiments of the present invention, the expansion convenience tool units may be further expandable by comprising a second rail slide adapter.

In certain embodiments of the present invention, the rail slide adapter, the second rail slide adapter, and complimentary rail slide are Picatinny type rails.

In certain embodiments of the present invention, the rail slide adapter may be used for mounting, e.g., a bicycle mount, a dashboard mount, a gun mount, or a D.O.T. compliant trailer light magnetic mount. In certain embodiments, multiple rail mounting combinations may be used to position the device using rail slide adapter in combination with one or more rail slide mounts.

In certain embodiments of the present invention, the rail slide adapter may be covered by a simple cover plate to enclose the rail adapter.

In certain embodiments of the present invention, the expansion convenience tool units are selected from the group consisting of a battery (i.e., to increase battery capacity/voltage, e.g., 100V-220V), smart device integration, flashlight, laser, video projector, air pump, car battery jump starter, hand charging unit (e.g., crank charging, slide charging, shake charging, kinetic charging), solar collection cell unit, and any combination thereof. In certain embodiments, a battery expansion convenience tool unit may provide an additional 1× factor, 2× factor, 4× factor, 8×, or 10× factor (or more) additional charge capacity.

In certain embodiments of the present invention, the expansion convenience tool units are any tool that may be modified to engage the rail slide adapter with the rail system and conductively interface, e.g., any powered tool.

III. Expandable Mikropact Adaptive Charge Transference Devices of the Invention Another embodiment of the present invention provides an expandable mikropact adaptive charge transference (ACT) device comprising:

- a mikropact adaptive charge transference (ACT) device of the present invention;
- a rail slide adapter (e.g., integrated as part of the mikropact containment shell or mounted on the mikropact containment shell as a separate unit) suitable for transitory combination with one or more expansion convenience tool units incorporating a complimentary rail slide affording transitory connection of the expansion convenience tool unit with the mikropact ACT device; and
- one or more expansion convenience tool units incorporating a complimentary rail slide affording transitory connection of the expansion convenience tool unit with the mikropact ACT device.

In certain embodiments of the expandable mikropact adaptive charge transference (ACT) device of the present invention, the expansion convenience tool units conductively interfaces with the adaptive charge transference (ACT) device through one or more points on the rail slide adapter and complimentary rail slide, e.g., rail slot contacts.

In certain embodiments of the expandable mikropact adaptive charge transference (ACT) device of the present invention, the expansion convenience tool units may be further expandable by comprising a second rail slide adapter.

In certain embodiments of the expandable mikropact adaptive charge transference (ACT) device of the present invention, the rail slide adapter, the second rail slide adapter, and complimentary rail slide are Picatinny type rails.

In certain embodiments of the expandable mikropact adaptive charge transference (ACT) device of the present invention, the rail slide adapter may be used for mounting, e.g., a bicycle mount, a dashboard mount, a gun mount, or a D.O.T. compliant trailer light magnetic mount. In certain embodiments, multiple rail mounting combinations may be used to position the device using rail slide adapter in combination with one or more rail slide mounts.

In certain embodiments of the expandable mikropact adaptive charge transference (ACT) device of the present invention, the rail slide adapter may be covered by a simple cover plate to enclose the rail adapter.

In certain embodiments of the expandable mikropact adaptive charge transference (ACT) device of the present invention, the expansion convenience tool units are selected from the group consisting of a battery (i.e., to increase battery capacity/voltage, e.g., 100V-220V), smart device integration, flashlight, laser, video projector, air pump, car battery jump starter, hand charging unit (e.g., crank charging, slide charging, shake charging, kinetic charging), solar collection cell unit, and any combination thereof. In certain embodiments, a battery expansion convenience tool unit may provide an additional 1× factor, 2× factor, 4× factor, 8×, or 10× factor (or more) additional charge capacity.

In certain embodiments of the expandable mikropact adaptive charge transference (ACT) device of the present invention, the expansion convenience tool units are any tool that may be modified to engage the rail slide adapter with the rail system and conductively interface, e.g., any powered tool.

IV. Design Aspects of the Invention

Independent of the utility related to the devices, and components thereof, of the present invention, the ornamental appearance of any novel design provided herein is intended to be part of this invention, for example, each of the perspective views in FIGS. 1 to 7, which may form an independent or combined ornamental appearance of the devices, and components thereof, described herein.

Accordingly, one embodiment of the present invention provide an ornamental design for a mikropact adaptive charge transference (ACT) device of the present invention as shown and described.

EXEMPLIFICATION

Having thus described the invention in general terms, reference will now be made to the accompanying drawings of exemplary embodiments, which are not necessarily drawn to scale, and which are not intended to be limiting in any way.

In this respect, it is to be understood that the invention is not limited in its application to the details of construction and to the arrangements of the components set forth in the description provided herein or illustrated in the Figures. The invention is capable of other embodiments and of being practiced and carried out in various ways. Also, it is to be understood that the phraseology and terminology employed herein are for the purpose of description and should not be regarded as limiting.

Example 1

Structure of Example of Mikropact Adaptive Charge Transference (ACT) Devices of the Present Invention FIG. 1 depicts a top down perspective view of certain embodiments of the mikropact adaptive charge transference (ACT) device of the present invention. The mikropact adaptive charge transference (ACT) device comprises a mikropact containment shell 1 constructed to reversibly and operationally integrate a removable multi-stage charge transference micro-core structure 2. The micro-core structure provides a female USB type A port 3, along with USB type C 4 and USB mini 5 female ports.

The mikropact adaptive charge transference (ACT) device of FIG. 1 shows the AC wall outlet plug ports 6 suitable to receive male connectors of a range of plug types, including, but not limited to Type A to Type O. Two sliders 7 that move the retractable pins corresponding to the AC male connector orientations are shown. The retractable USB data storage slide 8 is also shown just below the two sliders 7.

Display 9 is shown and positioned next to two selector/actuator buttons that interact with the display. Next to the display is lanyard holes 34 for positioning a lanyard line that may activate panic alarm if pulled with enough force.

The integrated flexible charging cord 10 is depicted in the installed and unused position.

LED indicator lights 11 are shown on two sides of the mikropact ACT device for use in flashlight or strobe light utilities, as well as status indications (e.g., based on intensity of the light projected/produced). Card reader 12 is provided for scanning credit cards, and may be Bluetooth connected to a mobile device. Finally, seat belt cutter 13 is presented directly above card reader 12.

Figure 2:
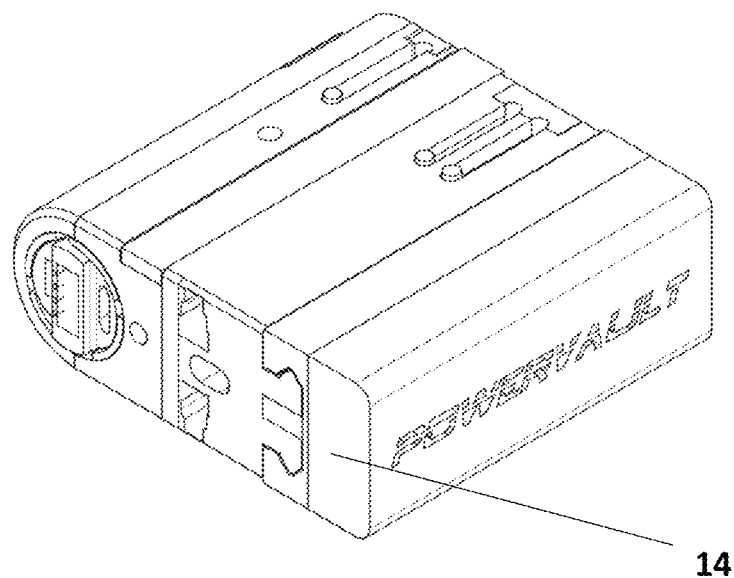
FIG. 2 depicts a top down perspective view of certain embodiments of the mikropact adaptive charge transference (ACT) devices of the present invention shown in FIG. 1, rotated by about 90 degrees.

FIG. 2 depicts a top down perspective view of certain embodiments of the mikropact adaptive charge transference (ACT) device of the present invention shown in FIG. 1, rotated by about 90 degrees. Expansion convenience tool unit 14 is a battery capacity expansion, where the complimentary Picatinny rail slide is in transitory combination with the Picatinny rail slide adapter of the mikropact containment shell 1.

Figure 3:
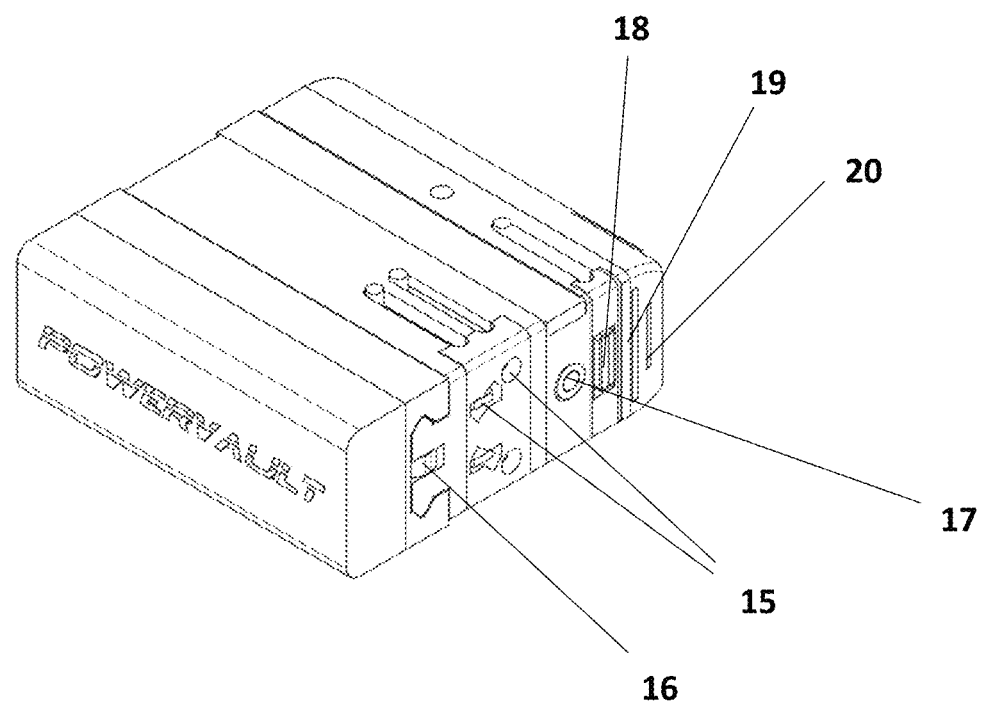
FIG. 3 depicts a top down perspective view of certain embodiments of the mikropact adaptive charge transference (ACT) devices of the present invention shown in FIG. 1, rotated by about 180 degrees.

FIG. 3 depicts a top down perspective view of certain embodiments of the mikropact adaptive charge transference (ACT) device of the present invention shown in FIG. 1, rotated by about 180 degrees. Pin housings 15 house the retractable pins corresponding to the AC male connector orientations suitable to create male connectors of a range of plug types, including, but not limited to Type A to Type O, e.g., US/AUS and EU/UK orientations. Retractable European Union ground pin 16 is also shown. Sequentially based on positioning, is shown LED laser 17, retractable USB data storage 18 (which may also be used as male USB connector for input/output charge), SD card slot 19, and SIM card slot 20.

Figure 4:
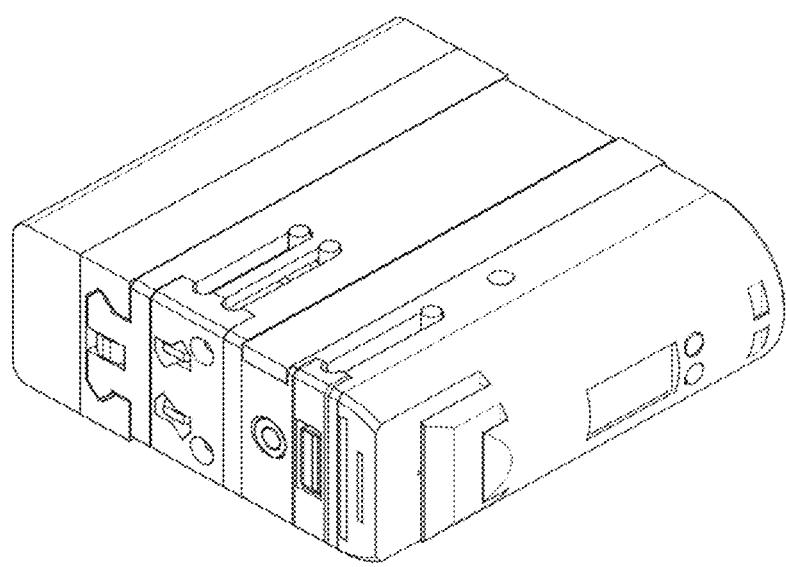
FIG. 4 depicts a top down perspective view of certain embodiments of the mikropact adaptive charge transference (ACT) devices of the present invention shown in FIG. 1, rotated by about 270 degrees.

FIG. 4 depicts a top down perspective view of certain embodiments of the mikropact adaptive charge transference (ACT) device of the present invention shown in FIG. 1, rotated by about 270 degrees.

Figure 5:
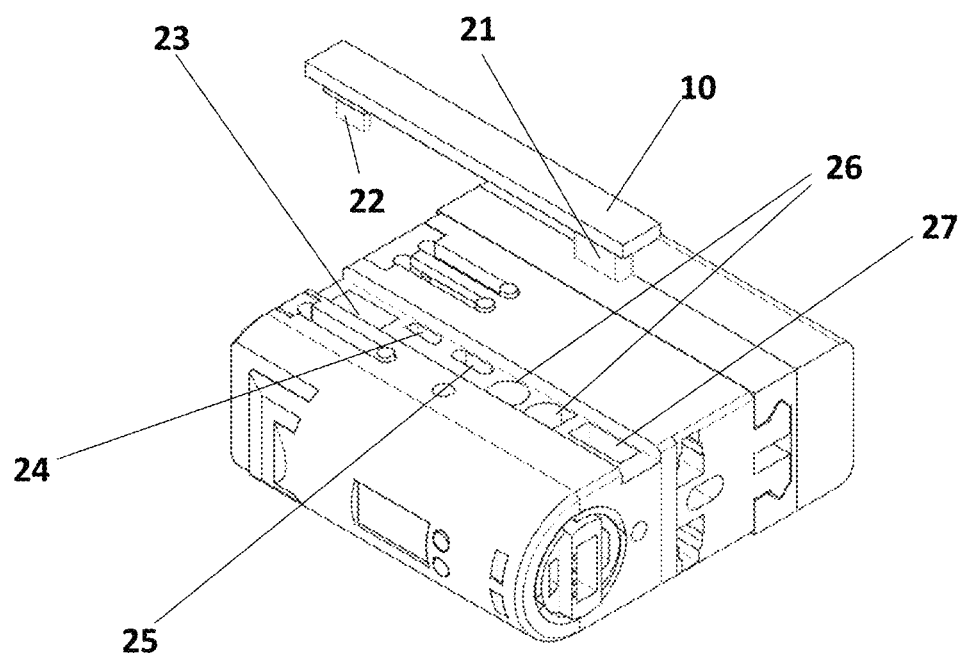
FIG. 5 depicts a top down perspective view of certain embodiments of the mikropact adaptive charge transference (ACT) devices of the present invention shown in FIG. 1, with the integrated flexible charging cord removed.

FIG. 5 depicts a top down perspective view of certain embodiments of the mikropact adaptive charge transference (ACT) device of the present invention shown in FIG. 1, with the integrated flexible charging cord 10 removed. USB type A tip 21 is suitable for flexible connection to female USB type A port 27. USB mini magnetically interchangeable connector tip 22 may be removed and replaced by an alternative tip stored in storage cavity 23. USB mini port 24 and USB type C port 25 are also located under the integrated flexible charging cord 10. Lastly, high input/output charging port system 26 (e.g., for car jump starting) comprises a double port, with port shape that affords a single cord orientation.

Figure 6:
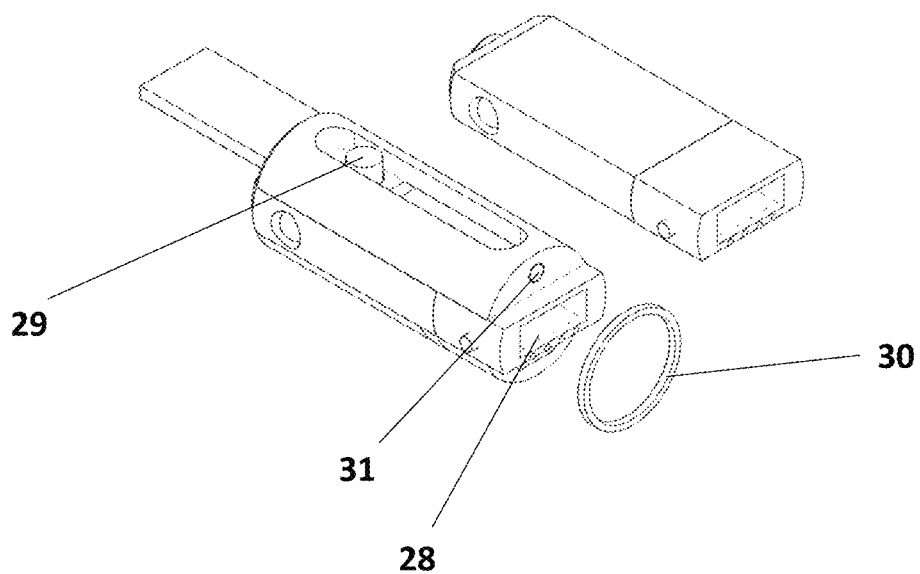
FIG. 6 depicts a top down perspective view of certain embodiments of the removable multi-stage charge transference micro-core structures of the present invention, with center USB component shown separately.

FIG. 6 depicts a top down perspective view of certain embodiments of the removable multi-stage charge transference micro-core structures of the present invention, with center USB component shown separately for convenience. USB type A port 28 conductively interfaces with the retractable USB type A male connector, with retraction slider 29 shown. Further, wireless charging coil 30 affords independent wireless recharging of the removed micro core structure without the mikropact containment shell. LED light 31 may be used as an indicator light or flashlight, depending on light intensity.

Figure 7:
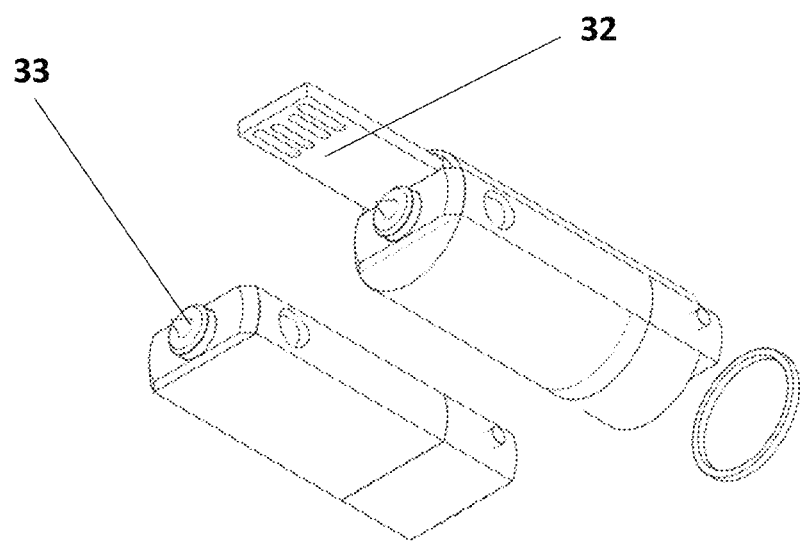
FIG. 7 depicts a top down perspective view of certain embodiments of the removable multi-stage charge transference micro-core structures of the present invention shown in FIG. 6, flipped by 180 degrees.

FIG. 7 depicts a top down perspective view of certain embodiments of the removable multi-stage charge transference micro-core structures of the present invention shown in FIG. 6, flipped by 180 degrees. Glass breaker 33 is shown as integrated into the removable multi-stage charge transference micro-core structures. Further, retractable USB type A male connector 32 is shown, which may also serve as data storage interface.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in certain embodiments, to represent a shorthand or convenient manner of listing independent embodiments; as such, each member of the list should be considered a separate embodiment.

What is claimed is:

1. A mikropact adaptive charge transference (ACT) device comprising:
   a mikropact containment shell constructed to reversibly and operationally integrate a removable multi-stage charge transference micro-core structure, wherein the mikropact containment shell is adapted to incorporate one or more convenience tools; and
   the removable multi-stage charge transference micro-core structure that reversibly integrates with the mikropact containment shell,
wherein the mikropact ACT device incorporates both a 12V DC female socket port and a 12V DC male socket connector.

2. The mikropact adaptive charge transference (ACT) device of claim 1, wherein the mikropact containment shell is sized to fit in an average pocket volume.

3. The mikropact adaptive charge transference (ACT) device of claim 1, wherein the removable multi-stage charge transference micro-core structure provides charge storage, charge pass-through, and charge conversion/adaption.

4. The mikropact adaptive charge transference (ACT) device of claim 1, wherein the removable multi-stage charge transference micro-core structure is removed from the 12V DC female socket port, reversed, and operationally integrated with the mikropact containment shell to provide the 12V DC male socket connector.

5. The mikropact adaptive charge transference (ACT) device of claim 4, wherein the 12V DC female socket port is suitable for supplying 12V DC output.

6. The mikropact adaptive charge transference (ACT) device of claim 1 wherein the removable multi-stage charge transference micro-core structure further comprises at least one retractable USB male connector.

7. The mikropact adaptive charge transference (ACT) device of claim 1, wherein the removable multi-stage charge transference micro-core structure stores charge from any input charge to the mikropact adaptive charge transference (ACT) device.

8. The mikropact adaptive charge transference (ACT) device of claim 1, wherein the removable multi-stage charge transference micro-core structure is independently wirelessly rechargeable without the mikropact containment shell.

9. The mikropact adaptive charge transference (ACT) device of claim 1, further comprising one or more components selected from the group consisting of a solar collector, a wireless charging output, a wireless charging input, and any combination thereof.

10. The mikropact adaptive charge transference (ACT) device of claim 1, further comprising a high input/output charging port system.

11. The mikropact adaptive charge transference (ACT) device of claim 1, wherein the mikropact ACT device is suitable for use as a global power adapter comprising an alternating current (AC) input and an AC output operationally associated to convert an input voltage to a different output voltage.

12. The mikropact adaptive charge transference (ACT) device of claim 1, comprising one or more retractable pins as an alternating current (AC) male connector.

13. The mikropact adaptive charge transference (ACT) device of claim 1, comprising the convenience tool selected from the group consisting of a Wi-Fi receiver, a Wi-Fi generator, a credit card reader, a Bluetooth receiver/transmitter, a GPS, a glass breaker, a seat belt cutter, a powered light, a laser light, a car battery starter, a panic alarm, speaker, camera, lanyard, SD card slot, SIM card slot, auto safety device for indicating dangerous conditions, water sensor strobe, USB data storage, and any combination thereof.

14. The mikropact adaptive charge transference (ACT) device of claim 1, further comprising a rail slide adapter suitable for transitory combination with the one or more expansion convenience tool units incorporating a complimentary rail slide affording transitory connection of the one or more expansion convenience tool units with the mikropact ACT device.

15. The mikropact adaptive charge transference (ACT) device of claim 14, wherein the one or more expansion convenience tool units conductively interfaces with the mikropact adaptive charge transference (ACT) device through one or more points on the rail slide adapter and the complimentary rail slide.

16. The mikropact adaptive charge transference (ACT) device of claim 14, wherein the one or more expansion convenience tool units are selected from the group consisting of a battery, smart device integration, flashlight, laser, video projector, air pump, car battery jump starter, hand charging unit, solar collection cell unit, and any combination thereof.

17. An expandable mikropact adaptive charge transference (ACT) device comprising:
   the mikropact adaptive charge transference (ACT) device of claim 1;
   a rail slide adapter suitable for transitory combination with one or more expansion convenience tool units incorporating a complimentary rail slide affording transitory connection of the one or more expansion convenience tool units with the mikropact ACT device; and
   the one or more expansion convenience tool units incorporating the complimentary rail slide affording transitory connection of the one or more expansion convenience tool units with the mikropact ACT device.

18. The expandable mikropact adaptive charge transference (ACT) device of claim 17, wherein the one or more expansion convenience tool units conductively interfaces with the mikropact adaptive charge transference (ACT) device through one or more points on the rail slide adapter and the complimentary rail slide.

19. The expandable mikropact adaptive charge transference (ACT) device of claim 17, wherein the one or more expansion convenience tool units are selected from the group consisting of a battery, smart device integration, flashlight, laser, video projector, air pump, car battery jump starter, hand charging unit, solar collection cell unit, and any combination thereof.

* * * * *